Figure 1:
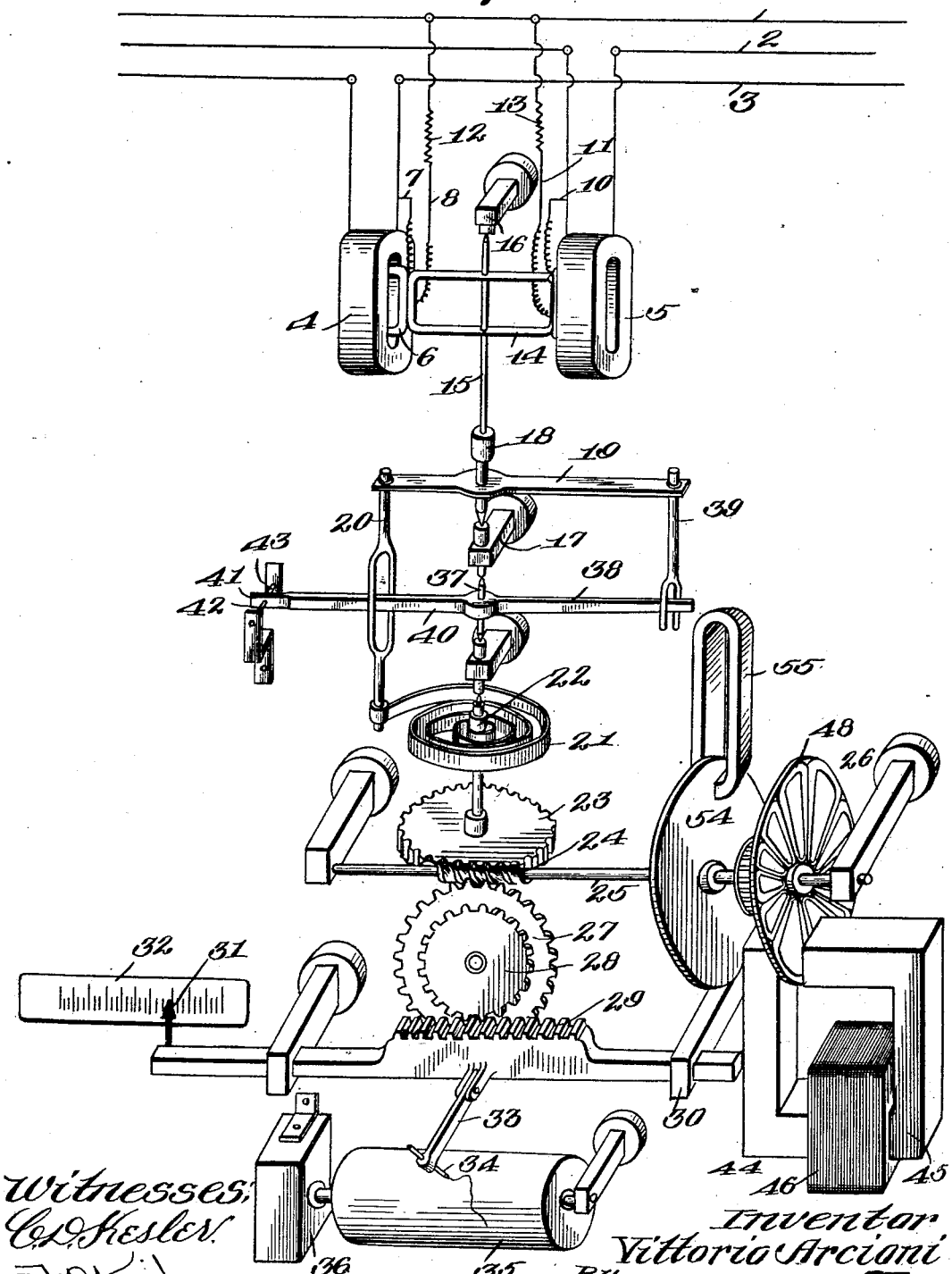

No. 713,934. Patented Nov. 18, 1902.
V. ARCIONI.
WATTMETER.
(Application filed June 25, 1902.)
(No Model.) 3 Sheets—Sheet 1.

No. 713,934. Patented Nov. 18, 1902.
V. ARCIONI.
WATTMETER.
(Application filed June 25, 1902.)
(No Model.) 3 Sheets—Sheet 2.
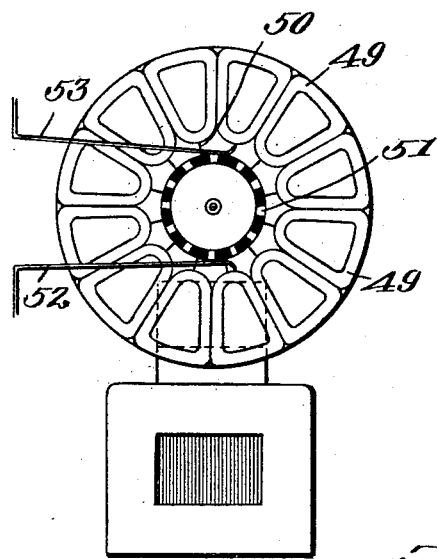
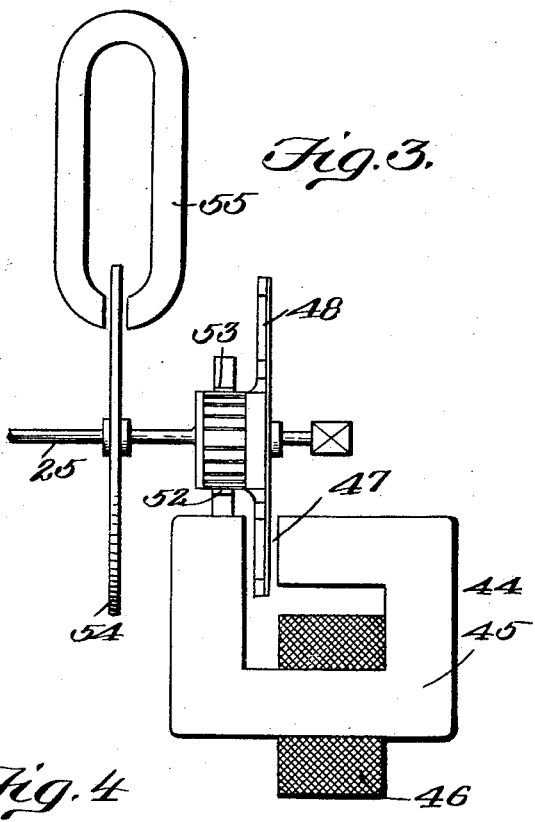
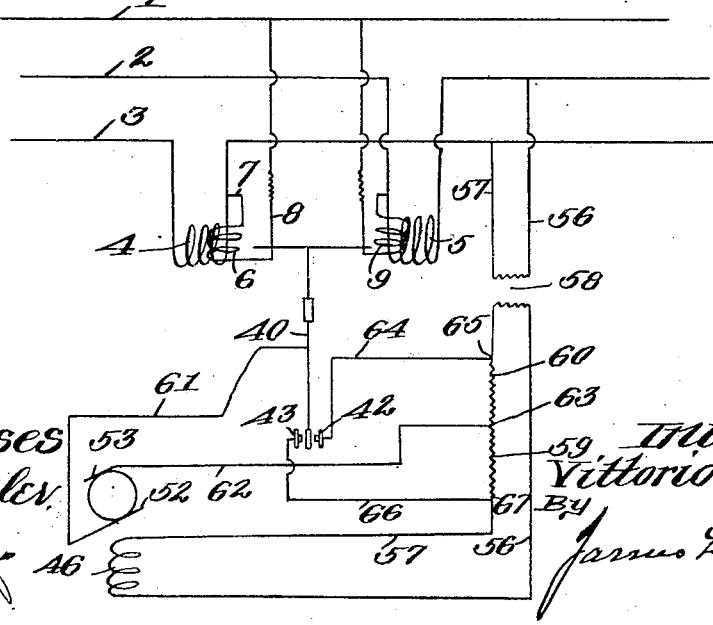

No. 713,934. Patented Nov. 18, 1902.
V. ARCIONI.
WATTMETER.
(Application filed June 25, 1902.)
(No Model.) 3 Sheets—Sheet 3.
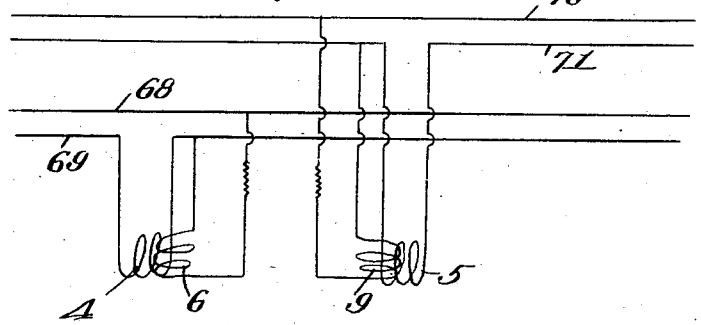
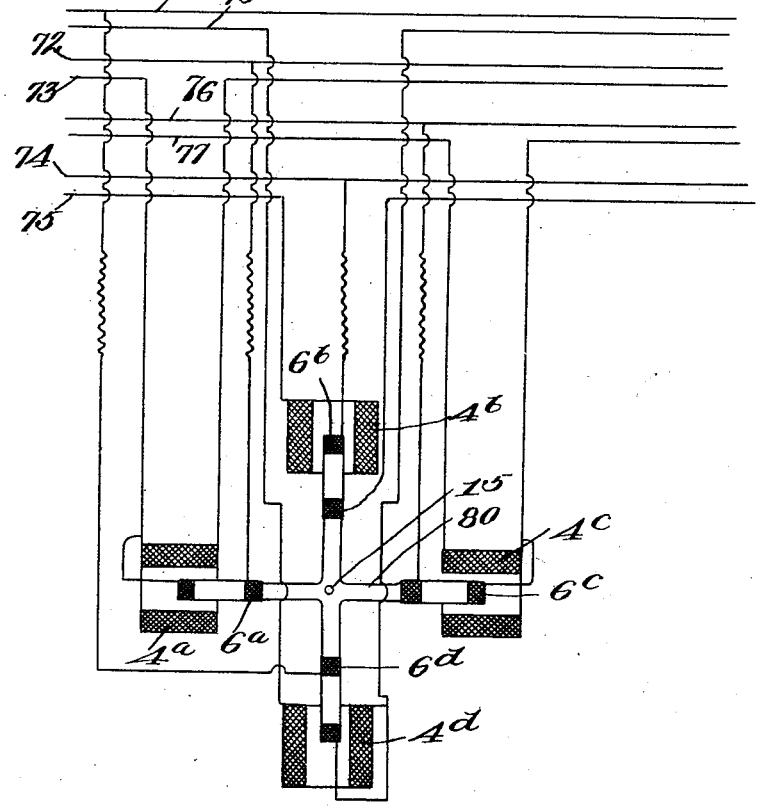
Witnesses:
Inventor
Vittorio Arcioni
By James L. Norris
Atty

UNITED STATES PATENT OFFICE.

VITTORIO ARCIONI, OF SPOLETA, ITALY, ASSIGNOR TO CAMILLO OLIVETTI, OF IVREA, ITALY.

WATTMETER.

SPECIFICATION forming part of Letters Patent No. 713,934, dated November 18, 1902.

Application filed June 25, 1902. Serial No. 113,180. (No model.)

*To all whom it may concern:*

Be it known that I, VITTORIO ARCIONI, a subject of the King of Italy, residing at Spoleta, Italy, have invented new and useful Improvements in Wattmeters, of which the following is a specification.

My invention relates to electrical measuring instruments, and particularly to wattmeters, the object of the same being to provide means whereby the total energy or other value of an electric current may be measured in a polyphase system.

A further object of the invention is to provide means whereby the total energy or other value of an electric current may be measured on two or more independent circuits.

Other objects of the invention will hereinafter appear, and the novel features thereof will be set forth in the claims.

In the drawings forming part of this specification, Figure 1 is a perspective view of the principal parts of my improved wattmeter, the motor coöperating therewith, the indicating and recording mechanism actuated thereby, and the circuit connections between a triphase system of electrical distribution and the meter-coils. Fig. 2 is a sectional side elevation of the motor employed. Fig. 3 is a front elevation of the same. Fig. 4 is a diagrammatic view showing the circuit connections between a triphase system of electrical distribution, the meter, and the motor coöperating therewith. Fig. 5 is a similar view showing the method of connecting up the meter-coils with two independent circuits for measuring the total energy or other value of the current therein. Fig. 6 is a similar view showing the connections between the meter and four independent circuits, whereby the total energy or other value of the current passing therethrough may be measured.

Like reference-numerals indicate like parts in the different views.

My invention has to do with that class of electrical measuring instruments in which the movable part of the meter is normally maintained at the zero-point by a spring or other counterbalancing device the tension of which is increased or decreased by a reversible electric motor automatically thrown into operation in one direction or the other by a movement or deflection of the movable part of the meter. The force exerted by said motor or by said spring or counterbalancing device in overcoming the torque of the movable part is the force or value which is measured.

The invention has been illustrated in Figs. 1 and 4 of the drawings in connection with the line-wires 1, 2, and 3 of a three-phase system of electrical distribution. The stationary field-coil 4 of the meter is connected up in series with the line-wire 3, and the field-coil 5 of said meter is connected up in series with the line-wire 2. The armature-coil 6, which is located within the fixed field-coil 4, is connected in shunt or parallel with the line-wires 3 and 1 through the flexible wires 7 and 8, and the armature-coil 9, which is located within the fixed field-coil 5, is connected up in parallel or shunt with the line-wires 2 and 1 through the flexible connecting-wires 10 and 11. The coils 4 and 5 are made from wire of sufficient size to carry the entire load of the circuit, whereas the coils 6 and 9 are made of very fine insulated wire and are of high resistance. The wires 8 and 11, moreover, which connect with the armature-coils 6 and 9, respectively, are provided with non-inductive resistance-coils 12 and 13, having a low coefficient of temperature for the purpose of regulating the shunted current and decreasing the temperature coefficient and inductance of the instrument. The coils 6 and 9 are electrically disconnected from each other, but are mechanically connected with each other by means of a frame 14, secured centrally to the rock-shaft 15, having bearings at its opposite ends in the blocks 16 and 17. The shaft 15 is made in two parts, the same being rigidly connected to each other by an insulating-sleeve 18. Secured to said shaft and extending transversely on opposite sides thereof is an arm 19, connected at one end through a rigid rod or bar 20 with the free end of a voluted coil-spring 21. The inner end of the spring 21 is connected to a shaft 22 in the same axial line with the shaft 15 and having bearings at its upper and lower ends. The lower end of the shaft 22 has secured to it a worm-gear 23, with which meshes a worm 24 on the armature-shaft 25 of an electric motor 26. The shaft 25 may, however, be any other shaft which is connected with and driven by the motor 26. Also meshing with the worm 24 on the shaft 25 is a worm-gear 27, having secured to it a pinion 28, meshing with a rack 29, longitudinally movable in bearings 30 and carrying an indicating hand or pointer 31 on one end. The said hand or pointer 31 moves in front of a dial-plate 32. The rack 29 also carries an arm 33, having mounted in the free end thereof a pencil, pen, or other marking device 34, which bears upon the face of a drum 35, having a continuous rotary movement imparted to it at a uniform rate of speed by the clock mechanism 36 or other suitable motor.

Located in line with the shafts 15 and 22, preferably between the same, is a shaft 37, having a laterally-extending spring-arm 38, secured thereto and connected through the forked rod 39 with the arm 19 on the shaft 15, the connection between the rod 39 and the arm 19 being at that end of the latter which lies opposite the point of connection of the rod 20 therewith. Also secured to the shaft 37, on the side thereof opposite the spring-arm 38, is a rigid bar 40, preferably provided at one end with a strip 41, of platinum, movable between the contact-points 42 43, as clearly shown. The contact-points 42 and 43 are located in close proximity to each other, so that the slightest deviation of the bar 40 will cause the engagement of the strip 41 with one or the other of said contact-points.

In order to be effective, the electric motor 26 must answer the following requirements—that is, it must be free from the formation of dead-centers, its inertia must be small, it must be capable of ready reversal, its armature must have small inductance and large resistance, and it must be capable of operation at small voltage—so that the commutator and the brushes thereon, as well as the contact-points through which the current is supplied to the armature thereof, will not be rapidly burned out by reason of sparking. The motor illustrated particularly in Figs. 2 and 3 of the drawings answers these requirements. The inductor or field-magnet 44 thereof has a laminated-iron core 45, surrounded by the energizing-coil 46. The poles of said inductor approach each other quite closely, leaving a narrow air gap or space 47, into which projects one edge of the rotating armature 48. The said armature 48 is made up of a number of triangular coils 49, of insulated wire, mounted in a frame of poor conducting material. Each coil 49 of said armature is connected in series in a closed circuit with the adjacent coils similar to the ordinary continuous-current disk armatures. The points where the different coils are joined are connected through the wires 50 with the bars of the commutator 51, to which the current is supplied for operating the motor through the brushes 52 and 53. The coils 49 of the armature are of such width that more than one of the same are included in the air-gap 47 of the inductor 44 at the same time. By this construction it is impossible for dead-centers to occur. The remaining and more numerous coils 49 of the armature are located outside the air-gap and their inductance is small. The wire of said coils is of small diameter and is of high resistance. These conditions are particularly important when the motor is operated by an alternating current, because with the inductance of the armature small and its resistance large the current in the armature has a very small difference of phase from the inducting magnetic flux obtained from the current which energizes the armature. If the armature and the inducting-coils are energized by a current, either alternating or continuous, the armature will rotate in a certain direction; but if without changing the direction of the current in the inducting-coils the current in the armature is reversed the motion of the motor will also be reversed. The motor 26 is preferably provided with a retarding device which has been illustrated as consisting of a conducting-disk 54 on the armature-shaft 25, which rotates between the poles of a magnet 55, which induces currents which oppose the movement of the armature-shaft 25 in either direction. This retarding device is necessary for decreasing the oscillations of the armature, which would render accurate indications of the current measured impossible.

The coil 46 of the inductor 44 is included in a normally closed circuit 56 57, which has been shown in the drawings as a shunt-circuit from the line-wires 2 and 3 of the three-phase system. It may, however, be supplied with current from any suitable source of energy. Included in the circuit 56 57 may be a transformer 58 for adapting the voltage of the line to the capacity of the motor. Also included in the circuit 56 57 are two non-inductive resistance-coils 59 60. Leading from the commutator-brush 52 is a wire 61, which connects with the conducting-rod 40, heretofore referred to, and leading from the commutator-brush 53 is a wire 62, which connects with the wire 57 at the point 63 between the resistance-coils 59 and 60. The wire 64 leads from the contact-point 42 to the wire 57 and connects therewith at a point 65 at the end of the resistance-coil 60 opposite the point 63, and leading from the contact-point 43 is a wire 66, which connects with the wire 57 at the point 67 at the end of the resistance-coil 59 opposite the point 63. By this construction it will be seen that at the points 65 and 67 there is a difference in polarity with respect to the point 63 between the resistance-coils 59 and 60.

The operation of my invention is as follows: When there is a load upon the line, and consequently a flow of current in the circuit, including the coils 4 and 6 and 5 and 9, electrodynamic forces are generated which have a tendency to rotate the moving part of the meter with a torque proportional to the whole energy of the three-phase circuit. The connections must be made, however, in such a way that the two electrodynamic actions on the coils 6 and 9 will have the same direction and that the coils 4 and 5, and consequently the coils 6 and 9, are sufficiently far apart that the action of the coil 4 on the coil 6 and the action of the coil 5 on the coil 9 will be very small. The normal position of the bar 40 when there is no flow of current through the instrument is, with the strip 41 at the end thereof, located between and out of engagement with the contact-points 42 and 43. When, therefore, the moving part of the instrument is turned by the means just described, this motion thereof will be transmitted through the arm 19, the forked rod 39, and the spring-arm 38 to the shaft 37, which carries the rigid bar 40. Said bar will be turned, therefore, in one direction or the other against the action of the spring 21, so that the strip 41 on the end of said bar is brought into engagement with one or the other of the contact-points 42 43. Assume that contact takes place between the strip 41 and the contact-point 42. The circuit will then be closed through the armature of the motor over the following path: wire 62, commutator-brushes 53 52, commutator 51, wire 61, conducting-bar 40, contact-point 42, and wire 64. The motor 26 being thus thrown into operation, the shaft 25 thereof will be rotated, and through the worm 24 and worm-gear 23 its motion will be transmitted to the shaft 22, to which the spring 21 is connected. Said spring will then be wound in such direction as to increase the tension thereof in opposition to the electrodynamic force exerted on the movable part and transmitted to said spring through the arm 19 and rod 20. When the increased tension of the spring 21, brought about by the operation of the motor 26, exactly counterbalances the torque of the moving part of the meter, the contact-strip 41 will be moved away from the contact-point 42 to its original position between the contact-points 42 and 43. The circuit above traced through the armature of the motor will thus be broken and the motor immediately thrown out of operation. By the rotation of the shaft 25 while the motor 26 was in operation the worm-gear 27, carrying the pinion 28, was rotated and served to move the rack 29 so as to indicate by the hand or pointer 31 on the dial 32 the current consumed and to record upon the drum 35, by means of the marking device 34, the same information. It will of course be understood that the movement of the spring 21 of the worm-gear 23, of the worm-gear 27, and of the parts connected therewith and operated thereby will be proportional to the energy or other value of the current flowing through the instrument. If the current-flow through the instrument increases, the torque of the moving part will again overcome the tension of the spring 21 and the parts will be moved in the same direction as before, contact taking place between the strip 41 on the bar 40 and the contact-point 42. The circuit through the armature of the motor will again be closed over the same course as that above traced and the motor 26 will be thrown into operation in the same direction as before and continue in operation until the increased tension of the spring 21 exactly counterbalances the torque of the moving part of the meter. If, however, the current-flow decreases, the torque of the spring 21 will be greater than that of the moving part of the instrument, and the bar 40 will be moved in a reverse direction to that above described, causing the engagement of the strip 41 on the end of said bar with the contact-point 43. The flow of current through the armature of the motor will then be over the following path: wire 66, contact-point 43, conducting-bar 40, wire 61, commutator-brushes 52 53, commutator 51, and wire 62. The current-flow through the armature of the motor is the reverse of that above described, and consequently the movement of the motor itself will be reversed. The effect of this will be to rotate the shafts 25 and 22 in the opposite direction, which will relieve the tension of the spring 21 until it exactly counterbalances the torque of the moving part and the strip 41 is returned to its original position out of engagement with the contact-point 43 and between the contacts 42 and 43. The circuit through the armature of the motor being now again broken, the motor will be again thrown out of operation. During the operation last above described, however, the rack 29, through the worm-gear 37 and pinion 28, will have been moved in the opposite direction, so as to indicate upon the dial 32 and record upon the drum 35 a decreased flow of current. When the current the energy or other value of which is to be measured is an alternating current, the moving coils 6 and 9 are subject to vibrations, which interfere with the contact between the strip 41 and the contact-points 42 and 43. To avoid this inconvenience, the transmission of the movement of the shaft 15 to the conducting-bar 40 is effected through the flexible or spring arm 38, heretofore referred to. The bar 40 has a certain inertia, so that the rapid vibration of parts effected by the current and applied to the outer free end of the spring-arm 38 are not felt by the bar 40, while the movements of the moving coils 6 and 9 and of the spring 21 are transmitted. In this way the contact between the strip 41 and the contact-points 42 and 43 is rendered safe and reliable independently of the character of the current.

To adapt the apparatus for the measurement of the total energy or other value of the current-flow in two circuits, I connect the same up as illustrated in Fig. 5 of the drawings, wherein the fixed coil 4 of the meter is shown connected up in series on the circuit 68 69, whereas the moving coil 6, which coöperates therewith, is connected up in shunt on the same circuit. The fixed coil 5 of the apparatus, on the other hand, is connected up in series with the circuit 70 71, whereas the moving coil 9, which coöperates therewith, is connected up in shunt with the same circuit. The operation of the device in this connection is identical with that described with reference to the three-phase system.

To adapt the device for the measurement of the total energy or other value of three or more circuits, it is necessary that one fixed coil and one coöperating moving coil be employed for each circuit, the different moving coils being mechanically connected to each other and to the shaft 15. In Fig. 6 of the drawings I have shown the apparatus applied for the measurement of the total value or other energy of four separate circuits. As shown therein, I employ four fixed coils $4^a$ $4^b$ $4^c$ $4^d$, and coöperating therewith four moving coils $6^a$, $6^b$, $6^c$, and $6^d$. The coil $4^a$ is connected up in series on the circuit 72 73, whereas the coil $6^a$ is connected up in shunt on the same circuit. The fixed coil $4^b$ is connected up in series on the circuit 74 75, whereas the moving coil $6^b$, coöperating therewith, is connected up in shunt on the same circuit. The fixed coil $4^c$ is connected up in series on the circuit 76 77, whereas the moving coil $6^c$, coöperating therewith, is connected up in shunt on the same circuit. The fixed coil $4^d$ is connected up in series on the circuit 78 79, whereas the moving coil $6^d$ is connected up in shunt on the same circuit. The moving coils $6^a$, $6^b$, $6^c$, and $6^d$ are mounted in a four-armed frame 80, rigidly secured to the rock-shaft 15.

To adapt the device for use in measuring the energy or other value of a current on a single circuit, coils 4 and 6 or coils 5 and 9 may be dispensed with altogether. If the coils 5 and 9 are dispensed with, the coil 4 is connected up in series and the coil 6 in shunt with the circuit. In lieu of this, however, all of the coils above described may be employed by connecting up the fixed coils 4 and 5 in series with each other and in series with the line and connecting up the coils 6 and 9 in series with each other, but in shunt with the line.

It is evident that my invention, including the reversible motor 26, the spring 21, and the parts coöperating therewith, may be applied not only to wattmeters, but to all other electrical measuring instruments where the moving part is automatically brought to its zero position by an electric motor.

Having now described my invention, what I claim as new, and desire to secure by Letters Patent, is—

1. In an electric measuring instrument, two fixed coils in series on the line, two movable coils in shunt on the line acted upon by the fixed coils, and a reversible electric motor automatically thrown into operation by the movement in one direction or the other of said movable coils, for counterbalancing the action of the current thereon.

2. In an electric measuring instrument, two fixed coils in series on the line, two movable coils in shunt on the line acted upon by the fixed coils, a reversible electric motor automatically thrown into operation by the movement in one direction or the other of said movable coils, for counterbalancing the action of the current thereon, and means for indicating the force exerted by said motor.

3. In an electric measuring instrument, two fixed coils in series on the line, two movable coils in shunt on the line acted upon by the fixed coils, a reversible electric motor automatically thrown into operation by the movement in one direction or the other of said movable coils, for counterbalancing the action of the current thereon, and means for continuously recording the force exerted by said motor.

4. In an electric measuring instrument, two fixed coils in series on the line, two movable coils in shunt on the line acted upon by the fixed coils, a reversible electric motor automatically thrown into operation by the movement in one direction or the other of said movable coils, for counterbalancing the action of the current thereon, means for indicating, and means for continuously recording, the force exerted by said motor.

5. In an electric measuring instrument, a plurality of fixed coils in series on the line, a plurality of movable coils in shunt on the line, acted upon by the fixed coils, a rock-shaft to which the movable coils are connected, a spring for counterbalancing the action of the current on said coils, and a reversible electric motor, automatically thrown into operation in one direction or the other by the movement of said movable coils for increasing or decreasing the tension of said spring, and means for indicating the force exerted by said motor.

6. In an electric measuring instrument, a movable part acted upon by the current, and including a rock-shaft, a laterally-extending arm on said shaft, a voluted coil-spring having its free end connected with said arm, for counterbalancing the action of the current on said movable part, and a reversible electric motor automatically thrown into operation by the deflection of said movable part in one direction or the other, for increasing or decreasing the tension of said spring.

7. In an electric measuring instrument, a movable part acted upon by the current and including a rock-shaft, a laterally-extending arm on said rock-shaft, a torsional spring connected with said arm for counterbalancing the action of the current on said movable part, two contact-points, a contact-bar movable between the same, connections between said contact-bar and said arm, a reversible electric motor, and circuit connections in opposite directions between said contact-points and said motor, said motor acting upon said spring for increasing or decreasing the tension thereof.

8. In an electric measuring instrument, a movable part acted upon by the current, a reversible electric motor for counterbalancing the action of the current thereon, circuit connections in opposite directions through said motor including two contact-points, a conducting-bar coöperating with said contact-points and operated by said movable part, and a yielding connection between said movable part and said conducting-bar.

9. In an electric measuring instrument, a movable part acted upon by the current, a reversible electric motor for counterbalancing the action of the current thereon, circuit connections in opposite directions through said motor, including two contact-points, a conducting-bar coöperating with said contact-points and operated by said movable part, and a spring through which said movable part is connected to said conducting-bar.

10. In an electric measuring instrument, two fixed coils in series on the line, two movable coils in shunt on the line, acted upon by the fixed coils, a rock-shaft to which said movable coils are connected, a laterally-extending arm on said rock-shaft, a torsional spring connected with said arm for counterbalancing the action of the current on said coils, a reversible electric motor for increasing or decreasing the tension of said spring, circuit connections in opposite directions through said motor, including two contact-points, a conducting-bar movable between said contact-points, and a spring-arm connected respectively with said conducting-bar and said laterally-extending arm.

11. In an electric measuring instrument, two fixed coils in series on the line, two movable coils in shunt on the line, acted upon by the fixed coils, a rock-shaft to which said movable coils are connected, a torsional spring acting upon said rock-shaft for counterbalancing the torque of said movable coils, a reversible electric motor automatically thrown into operation by a movement of said movable coils, a shaft to which one end of said spring is connected, a worm-wheel thereon, a rotary shaft actuated by said motor, and a worm on the latter shaft meshing with said worm-wheel.

12. In an electric measuring instrument, two fixed coils in series on the line, two movable coils in shunt on the line, acted upon by the fixed coils, a rock-shaft to which said movable coils are connected, a torsional spring acting upon said rock-shaft for counterbalancing the torque of said movable coils, a reversible electric motor automatically thrown into operation by a movement of said movable coils, a shaft to which one end of said spring is connected, a worm-wheel thereon, a second worm-wheel, a pinion connected therewith, a rack in mesh with said pinion, a pointer carried by said rack and movable across the face of the indicating dial or plate, a rotary shaft actuated by said motor, and a worm thereon meshing with each of said worm-wheels.

13. In an electric measuring instrument, two fixed coils in series on the line, two movable coils in shunt on the line, acted upon by the fixed coils, a rock-shaft to which said movable coils are connected, a torsional spring acting upon said rock-shaft for counterbalancing the torque of said movable coils, a reversible electric motor automatically thrown into operation by a movement of said movable coils, a shaft to which one end of said spring is connected, a worm-wheel thereon, a second worm-wheel, a pinion connected therewith, a rack in mesh with said pinion, a rotary drum, a marking device carried by said rack, and coöperating with said drum, a rotary shaft actuated by said motor, and a worm on said shaft meshing with each of said worm-wheels.

14. A wattmeter for measuring the total energy of the current in a three-phase system of electrical distribution, comprising two fixed coils and two movable coils located partially within said fixed coils, one of said fixed coils being in series with one of the line conductors, the other of said fixed coils being in series with another of the line conductors, and said movable coils being in shunt between the first and second of said line conductors, respectively, and the third of said conductors, a counterbalancing device for equalizing the torque of said movable coil, and a reversible electric motor, thrown into operation by an increase or decrease in the energy of the current to be measured, for increasing or decreasing the tension of said counterbalancing device.

15. In a wattmeter, two fixed coils in series on the line, two movable coils in shunt on the line, acted upon by the fixed coils, a reversible electric motor automatically thrown into operation by an increase or decrease in the energy of the current to be measured for counterbalancing the action of the current on said coils, and a retarding device for said motor.

16. In a wattmeter, two fixed coils in series on the line, two movable coils in shunt on the line, acted upon by the fixed coils, a reversible electric motor automatically thrown into operation by an increase or decrease in the energy of the current to be measured for counterbalancing the action of the current on said coils, and a magnetic retarding device for said motor.

17. In a wattmeter, two fixed coils in series on the line, two movable coils in shunt on the line, acted upon by the fixed coils, and an electric motor for counterbalancing the action of the current on said coils, the said motor having a disk armature made up of a number of flat coils connected in series with each other, and having the poles of its inductor located in close relation to each other, forming an air-gap in which two or more of the coils of said armature lie at the same time, and means for automatically closing a circuit through said armature in one direction or the other, the said means being thrown into operation automatically by an increase or decrease in the energy of the current to be measured.

18. In a wattmeter, two fixed coils in series on the line, two movable coils in shunt on the line acted upon by said fixed coils, two contacts, a conducting-bar connected with said movable coils and coöperating with said contacts, a reversible electric motor for counterbalancing the action of the current on said coils, a normally closed circuit including the inductor-coils of said motor and two resistance-coils, circuit connections between said contacts and said closed circuit at points located respectively at the outer ends of said resistance-coils, and circuit connections between said conducting-bar, the armature of said motor and said closed circuit, at a point intermediate said resistance-coil, whereby the circuit through said armature may be closed in one direction or the other by the engagement of said bar with one or the other of said contacts upon an increase or decrease of the energy of the current through the instrument.

19. In a wattmeter, two fixed coils in series on the line, two movable coils in shunt on the line acted upon by said fixed coils, two contacts, a conducting-bar connected with said movable coils and coöperating with said contacts, a reversible electric motor for counterbalancing the action of the current on said coils, a normally closed shunt-circuit on the line including the inductor-coils of said motor and two resistance-coils, circuit connections between said contacts and said shunt-circuit at points located respectively at the outer ends of said resistance-coils, and circuit connections between said conducting-bar, the armature of said motor and said shunt-circuit, at a point intermediate said resistance-coils, whereby the circuit through said armature may be closed in one direction or the other by the engagement of said bar with one or the other of said contacts upon an increase or decrease of the energy of the current through the instrument.

20. In a wattmeter, two fixed coils in series on the line, two movable coils in shunt on the line acted upon by said fixed coils, two contacts, a conducting-bar connected with said movable coils and coöperating with said contacts, a reversible electric motor for counterbalancing the action of the current on said coils, a normally closed shunt-circuit on the line including the inductor-coils of said motor and two resistance-coils, a transformer in said shunt-circuit for adapting the voltage of the line to the capacity of the motor, circuit connections between said contacts and said shunt-circuit at points located respectively at the outer ends of said resistance-coils, and circuit connections between said conducting-bar, the armature of said motor, and said shunt-circuit at a point intermediate said resistance-coils, whereby the circuit through said armature may be closed in one direction or the other by the engagement of said bar with one or the other of said contacts upon an increase or decrease in the energy of the current through the instrument.

21. In an electrical measuring instrument, a movable part acted upon by the current and an electric motor for automatically counterbalancing the action of the current on said movable part, the said motor having a disk armature made up of a number of flat coils, connected in series with each other, and having the poles of its inductor located in close relation to each other, forming an air-gap in which two or more of the coils of said armature lie at the same time, and means for automatically closing a circuit through said armature in one direction or the other, the said means being thrown into operation automatically by an increase or decrease in the energy of the current to be measured.

22. In an electrical measuring instrument, a movable part acted upon by the current, two contacts, a conducting-bar connected with said movable part and coöperating with said contacts, a reversible electric motor for counterbalancing the action of the current on said movable part, a normally closed shunt-circuit on the line including the inductor-coils of said motor, two resistance-coils, a transformer in said shunt-circuit for adapting the voltage of the line to the capacity of the motor, circuit connections between said contacts and said shunt-circuit at points located respectively at the outer ends of said resistance-coils, and circuit connections between said conducting-bar, the armature of said motor, and said shunt-circuit at a point intermediate of said resistance-coils, whereby the circuit through said armature may be closed in one direction or the other by the engagement of said bar with one or the other of said contacts upon an increase or decrease in the energy of the current through the instrument.

In testimony whereof I have hereunto set my hand in presence of two subscribing witnesses.

VITTORIO ARCIONI.

Witnesses:
IGNAZIOE VERROTTI,
ANGELO LILI.